Feb. 26, 1963
E. B. NEITZEL
3,078,947
SEISMIC EXPLORATION METHOD
Filed Nov. 21, 1958
2 Sheets-Sheet 1
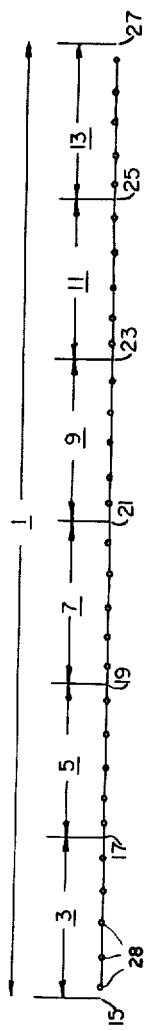
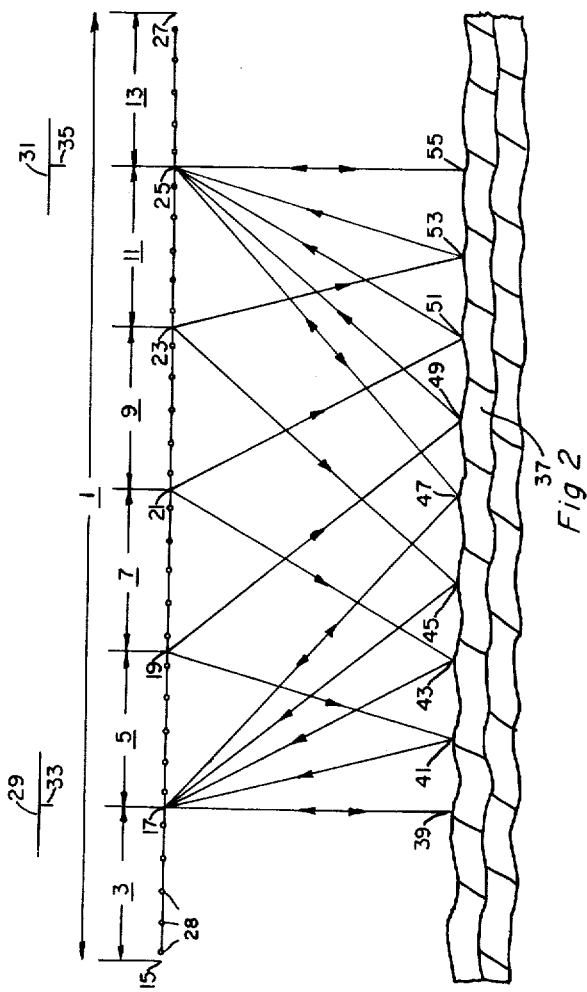
Attest
Charles F. Steininger
INVENTOR.
Edwin B. Neitzel
BY Herbert E. Bird
Attorney Feb. 26, 1963  E. B. NEITZEL  3,078,947
SEISMIC EXPLORATION METHOD
Filed Nov. 21, 1958  2 Sheets-Sheet 2
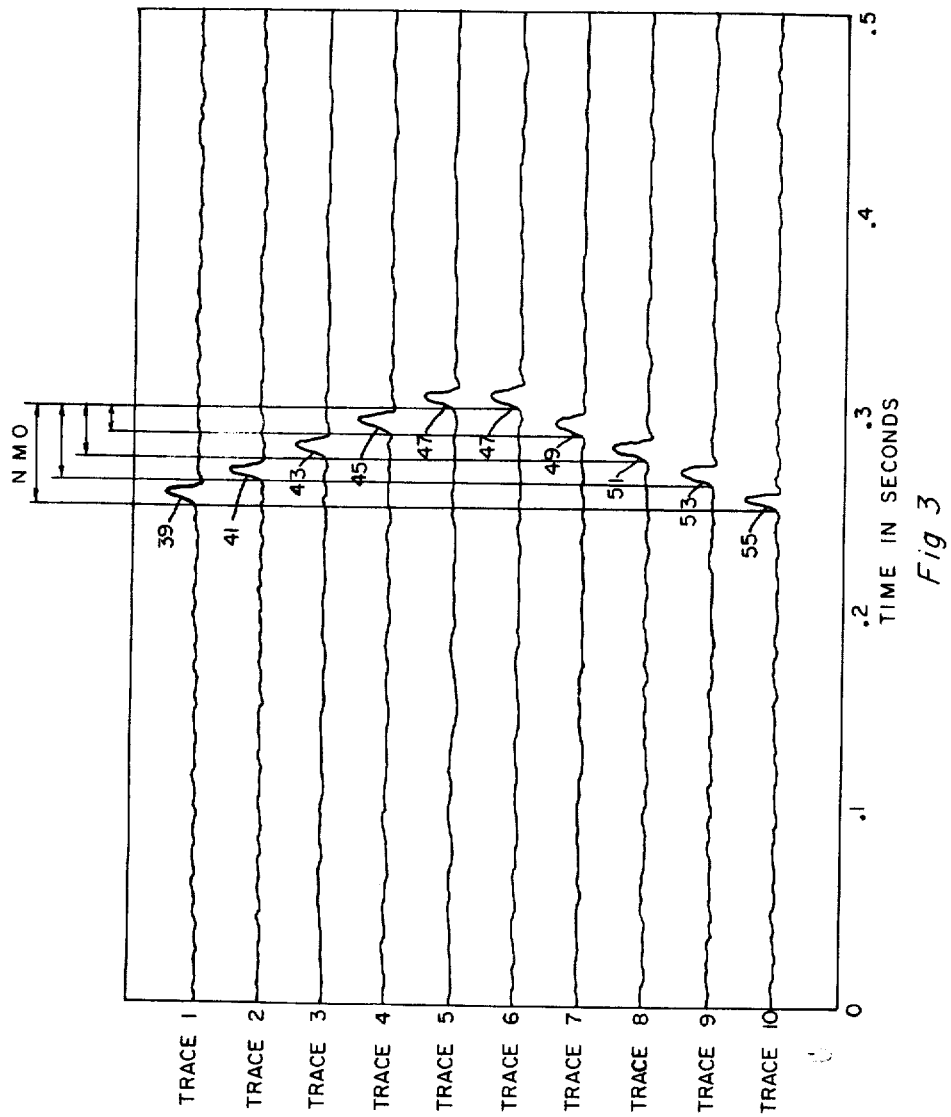
Attest
Charles H. Steininger
INVENTOR.
Edwin B. Neitzel
BY
Attorney

United States Patent Office 3,078,947
Patented Feb. 26, 1963

3,078,947
SEISMIC EXPLORATION METHOD
Edwin B. Neitzel, Dallas, Tex., assignor to The Atlantic Refining Company, Philadelphia, Pa., a corporation of Pennsylvania
Filed Nov. 21, 1958, Ser. No. 775,491
5 Claims. (Cl. 181—.5)

The present invention relates to the art of seismic exploration. More particularly the present invention relates to a method for continuously mapping subsurface formations in order to determine the depth, attitude and the like of such formations. In a still more specific aspect the present invention relates to a method for continuously mapping subsurface formations by a novel method of compositing seismic energy created by a plurality of low energy sources.

It is common in searching for areas likely to contain oil or other mineral deposits to create seismic disturbances at a point at or adjacent the surface of the earth by detonating an explosive charge in a shallow hole. Such detonation causes seismic energy to travel downwardly through the earth and a portion of such energy is reflected from various subsurface strata. Such reflected energy is detected at a number of points spaced from the point of the seismic disturbance by laying out seismic detectors in a variety of patterns. Such seismic detectors, generally referred to as seismometers or geophones, translate the detected energy into electrical impulses which, after suitable amplification, are recorded. The resultant seismic record may be in the form of visible traces recorded by a deflected light beam exposing photographic paper, visible traces formed by a conventional recording pen or invisible traces recorded on a ferromagnetic recording medium. These seismic traces are recorded in side-by-side relationship and are plotted against a time base supplied by one or more constant frequency timing signals simultaneously recorded with the recordation of the seismic traces. Accordingly, the resultant seismic traces are indicative of the travel time from the surface to a particular reflecting substrata and back to the point of detection. Utilizing this travel time data together with other known or measured characteristics of the area under exploration, one may then calculate the depth of particular formations; and, by covering an extended path along the surface of the earth, a plurality of such depth references may be plotted in order to map the subsurface formations and thus obtain a picture of a vertical section of the earth depicting the depth, attitude and the like of one or more subsurface formations.

In addition to the creation of seismic energy by means of an explosive charge, a great deal of effort has recently been devoted to the development of methods and means for creating seismic energy by thumping the surface of the earth with a heavy weight. In accordance with this method, a weight is suspended above the surface of the earth from a supporting structure and is permitted to drop to the earth's surface whereupon the impact serves to generate seismic energy. This method of generating seismic energy has several inherent advantages. Since it is not necessary to drill holes, as it is in the use of an explosive charge, the weight dropping method is generally considered less expensive and more rapid. In addition, the energy created by the impact of a falling weight is predominantly within the range of frequencies of interest in seismic exploration, and thus most of the energy created is useful energy; whereas, in the use of an explosive charge, only a small portion of the total energy is useful energy. However, in the weight dropping method, the magnitude of the energy created is comparatively small, and it is thus necessary to combine the energy created by a number of weight drops to obtain a single trace or seismic signal whose significant features are of sufficient magnitude to be recognizeable. It is the weight dropping technique to which the present invention is primarily directed. However, the present method is equally applicable to other exploration techniques where the combination of signals from a plurality of individual impulses must be or are desirably combined to form a single seismic signal or trace. For example, conventional methods of seismic exploration utilizing an explosive charge may also be employed in accordance with the present invention, and one may thus cut down the size of each charge and create a number of impulses at spaced points in an area as opposed to the creation of a single impulse at a single point.

In any of these techniques, however, there are several factors which affect the ultimate travel time as measured and as recorded on the seismic record, and it is necessary to compensate for these factors in order to obtain the theoretical true travel time or true depth. For example, a series of detection points are generally located along a line pointing toward or offset from the point of initiation of the seismic energy. In hilly or mountainous areas, the detection points may be at different elevations and thus the travel time to one or more of the detection points may be in error because of this difference in elevation. In other words, a detection point located in a valley will detect energy from a single source earlier than a detection point located on a hill will detect the same energy. Thus, in order to follow significant events on a plurality of seismic traces obtained at a plurality of detection points, one must compensate for this elevation error and relate all travel times to a common horizontal datum plane. Another error caused by the use of a plurality of detection points spaced from the source of energy and spaced from one another is that error caused by the so-called weathered layer. The weathered layer consists of the unconsolidated upper layer of the earth which extends to a depth of 50 to 100 feet and the velocity of travel of the seismic energy through this layer is slow as compared with the velocity of travel through consolidated subsurface formations. This error is generally compensated for by subtracting from the total travel time the extra time which it takes the energy to travel through the weathered layer as compared with its travel time through the consolidated formations. This correction may also differ from detection point to detection point since either the velocity of travel through the weathered layer or the thickness of the weathered layer may differ from detection point to detection point. Finally, because of the spacing of the detection points a finite distance from the source of energy and from each other detection point, it is obvious that energy traveling from the source to a subsurface reflecting horizon and back to the detection point will follow a slant-ray path rather than a vertical path. Since it is the time required to traverse a vertical path which one desires to obtain from seismic records, it is obvious that the recorded time must be corrected to subtract therefrom the additional time required for a wave to traverse a slant-ray path as opposed to a vertical path. Also, since each detection point is located a different finite distance from the source of energy, each slant-ray path will differ in length, and a different angularity correction must be applied for each detection point. This correction is commonly referred to as the normal move-out correction and must be applied in order to obtain accurate travel time or depth information. This is particularly true since the conventional seismic record consists of about 24 traces representing 24 detection points to spread over a distance of up to 3,000 feet.

It is known in the art that energy received from a single weight drop exhibits a low signal-to-noise ratio and that the energy from a plurality of such weight drops or other sources of low magnitude and low signal-to-noise ratio must be combined to form a single trace or seismic signal equivalent to that previously obtained from a single explosive charge of large magnitude. The necessity or desirability of repetitive weight drops also has its advantages in that by multiplying and spacing the number of weight drops one may obtain more continuous and better subsurface coverage in the area being explored. Various techniques for combining or compositing a plurality of signals received from a plurality of weight drops or other low energy sources have been proposed. However, none of these techniques takes full advantage of the fact that continuous subsurface coverage can be obtained. Of even greater importance, however, is the fact that prior art methods of combining or compositing require that the above-mentioned corrections, particularly the normal move-out correction, must be applied to each individual detected signal before any compositing or combining can be performed. Accordingly, this results in one of two rather cumbersome operations. The operator is required to either correct each individual signal in the field and then composite the corrected signals; or he must individually record and save for future operation each individual signal, thus ending up with a large volume of records. With regard to the first alternative, correction of individual seismic signals in the field requires rather complex and delicate computer equipment which is not particularly adapted to use in a field recording truck. As to the second alternative, it is obvious that the volume of records obtained is out of proportion to the amount of information gained; and, in addition, even though a central office computer may be employed to apply the necessary corrections, this equipment must be tailor-made for the weight dropping technique and is much more complex than those computer systems which have been developed for the correction of conventional seismic records.

It is, therefore, an object of the present invention to provide an improved method for seismic exploration.

Another object of the present invention is to provide a seismic exploration method which is fast, simple and economical.

A further object of this invention is to provide a seismic exploration method which takes full advantage of the desirable features of employing a large number of energy sources and combining the resultant detected signals.

Still another object of the present invention is to provide a seismic exploration method wherein the operator obtains substantially continuous and complete subsurface coverage along the exploration traverse.

A still further object of the present invention is to provide a method of seismic exploration wherein the resultant recorded information may be readily correlated along the entire length of the exploration traverse and a plurality of records obtained in adjacent traverses may be readily correlated.

Another and further object of the present invention is to provide a method of seismic exploration wherein it is unnecessary to make time corrections in the field during the process of recording.

Another object of the present invention is to provide a seismic exploration method which produces a seismic record containing a plurality of traces obtained by the combination of a plurality of spaced energy sources and which is the equivalent of conventional seismic records produced by recording the energy of a single source of energy.

Still another object of the present invention is to provide a seismic exploration method which produces a plurality of traces obtained by combining the energies created by a plurality of spaced sources of energy and which can be corrected by the use of conventional seismic record correctors.

Other and further objects of the present invention will be apparent from the following detailed description when read in connection with the accompanying drawings, wherein:

FIGURE 1 is a plane view of the surface of the earth illustrating the relative positions of a plurality of weight drop locations and detector groups, FIGURE 2 is an elevational view of a section of the earth illustrating the composite paths of seismic impulses generated at a plurality of weight drop locations and received at a plurality of detection groups, and FIGURE 3 is an example of a seismic record obtained by the practice of the present invention when utilizing the layout of FIGURE 1.

In accordance with the present invention, it has been found that substantially continuous subsurface coverage and easily correlated seismic traces may be obtained by dividing a continuous traverse along the surface of the earth into a plurality of equal intervals, creating at least one seismic impulse within each interval, locating at least two groups of detectors at spaced points along said traverse or offset therefrom, detecting energy generated by each source in all of the detector groups and combining signals received from all sources within two adjacent intervals to form a composite signal. This method may be modified to provide surface overlapping without repeating the generating of seismic energy by including within each successive compositing a portion of the signals received from energy sources previously composited. The records resulting from this exploratory technique are equivalent to conventional seismic records obtained from a single source of energy and reflect the same character and magnitudes of errors thus making it possible to remove all errors present in the record by the use of conventional seismic record correctors.

Although the following detailed example is directed specifically to the practice of the present method by the use of a falling weight as a source of energy, it should be understood that the present method is equally advantageous in any other exploratory technique where a plurality of sources of energy may be conveniently employed; for example, a small explosive charge may be detonated at each of those points where the drawings indicate that a weight is dropped.

Referring particularly to FIGURE 1 of the drawings, a line of traverse along the surface of the earth is shown as traverse 1. Traverse 1 is divided into six equal intervals 3, 5, 7, 9, 11 and 13, respectively. For convenience in further discussion of applicant's invention, the ends of the intervals are indicated by points 15, 17, 19, 21, 23, 25 and 27. Each of the subject intervals may contain a plurality of drop positions equally spaced one from the other within the interval, for example, five drop positions in each interval as depicted by the dots 28 in the drawings. Traverse 1 is preferably straight so that drop positions are substantially in line, although it is to be understood that surface conditions or other factors may make it desirable for traverse 1 to assume configurations other than that of a straight line. It should also be understood that each of the drop positions indicated may represent the composite center of a plurality of drops covering a circular area or some other configuration. It may also be impossible, due to surface conditions, to have the dimensions of intervals 3, 5, 7, 9, 11 and 13 equal. The equality of the intervals is desirably obtained but is not critical since appropriate adjustments of computed travel times may be made to compensate for inequality. Applicant has found that a convenient traverse length is about 1,500 feet; and, in such case, the interval lengths should be about 250 feet and the distance between drop positions about 50 feet. The most critical factor involved in the layout of the traverse is the length of the intervals into which the traverse is divided. The length of the intervals is critical to the extent that during the course of compositing signals generated from drops in two adjacent intervals the energies from the plural drops may be combined without correction for normal move-out if the total of the two intervals does not exceed about 500 feet. However, if, as taught by the prior art, the intervals covered by composited drops are excessively long, it is necessary to apply the normal move-out and other corrections before the individual signals may be combined or composited.

Circles 29 and 31 represent a circular group of seismic detectors having composite centers at points 33 and 35, respectively. All detectors in each group feed into a single output in accordance with conventional weight dropping practice. United States Patent to J. P. Woods, No. 2,678,107, FIGURE 3, shows a group of seismometers comprising two concentric circles and connected to produce a single trace. Other configurations of plural detectors which are well-known in the art may also be employed. As stated previously, the detector groups may be located along the line of traverse, although it is most convenient to offset the detector groups from the line of traverse as shown in FIGURE 1. The subject detectors may also be any well-known device heretofore used to detect seismic energy and convert this energy into electrical signals.

FIGURE 2 illustrates the composite paths of seismic waves generated by dropping the weight at the points indicated in the drawings and detecting resultant reflections at the two detector stations after reflection from subsurface reflecting barrier 37.

In carrying out the present invention, a truck equipped to drop the weight starts at one end of traverse 1 and proceeds along traverse 1 successively dropping the weight at each of the indicated points. In the example illustrated the weight is dropped at 5 points in each interval which gives a total of thirty drop points over the length of traverse 1. The number of weight drop points per interval and the number of intervals per traverse are not critical so long as more than one drop is made in each interval and a sufficient number of intervals are included between the detector stations to carry out applicant's novel method of compositing. It is also unnecessary to successively drop along a line or to start in any particular position so long as the desired number of drops are made at the positions indicated and the signals from each drop may be separately detected and recorded.

As the weight is sequentially dropped along interval 3, and subsequently along intervals 5, 7, 9, 11 and 13, reflected seismic waves from each individual drop are recorded in both seismometer groups 29 and 31. Thus, a total of 60 signals are recorded as the weight drop truck moves from one end of traverse 1 to the other.

The sixty individually recorded signals are then composited to produce a seismogram in the following manner. All signals resulting from impulses generated in intervals 3 and 5 and detected by seismometer group 29 are combined or composited to form a first composite trace by using magnetic tape or the like to sequentially record the signals and then simultaneously play out the recorded signals into a second single recording transducer. This composite trace may be considered to be the result of energy leaving point 17, the composite center of intervals 3 and 5, traveling downwardly to point 39 and being reflected upwardly to point 33, the composite center of seismometer group 29. Similarly, all energy created by the plural drops in intervals 5 and 7 and detected by seismometer group 29 are composited to form a second trace. In like manner traces 3, 4, and 5 are made by compositing the energy received by seismometer group 29 from intervals 7 and 9, 9 and 11, and 11 and 13, respectively. Thus, traces 2, 3, 4 and 5 represent energy leaving composite centers 19, 21, 23 and 25, being reflected from subsurface points 41, 43, 45, and 47 and being received at point 33, the composite center of seismometer group 29. Trace 6 is then prepared by compositing all signals received at point 35, the composite center of seismometer group 31, from all weight drops across intervals 3 and 5. Trace 6, therefore, is representative of seismic energy leaving the surface at point 17, being reflected from subsurface formation 37 at point 47 and returning to the surface at point 35. Trace 7 is formed by compositing all energy received by seismometer group 31 during the traverse of intervals 5 and 7. This composite trace then represents energy leaving point 19 at the surface, traversing downwardly to subsurface point 49 and being reflected back to point 35, the composite center of seismometer group 31. Traces 8, 9, and 10 are similarly formed by compositing all energy received by seismometer group 31 and created in intervals 7 and 9, 9 and 11, and 11 and 13, respectively. The composite signals recorded as traces 8, 9, and 10 thus represent reflections from subsurface points 51, 53 and 55, respectively.

It is to be observed that the resultant ten-trace record of FIGURE 3 provides a series of traces in which substantially complete and continuous subsurface coverage between seismometer groups 29 and 31 is obtained. In addition, traces 5 and 6 represent energy traveling along the same path and being reflected from the same subsurface point 47. Thus, traces 5 and 6 are convenient tie traces which greatly simplify correlation and analysis of the record. The record is also formed in a manner such that traces 1 and 10 will be the same as the end traces of records obtained by adjacent traverses, and traces 1 and 10 thus provide convenient tie traces from record to record. The resultant record also provides a 50 percent overlap of the drop points at the surface of the earth and, thus, continuous subsurface coverage without repeating drops within any one interval. Finally, by maintaining the interval lengths sufficiently short that the differences in angularity between the travel paths of each of the plurality of signals is insignificant, that is, the normal move-out error is sufficiently small that it can be disregarded, one need not correct each of the individual signals before compositing in the field and compositing may be performed as soon as all the desired signals have been recorded. Further, the ten-trace record resulting from the original sixty signals recorded may then be corrected in conventional seismic record correctors in a central office or other location since the resulting record exhibits elevation, weathering and normal move-out errors of the same character and approximately the same magnitude as a conventional seismic record produced from two sources of energy located, for example, at points 33 and 35 and sixty seismometer groups located at the indicated drop points of the figures. Thus, it is obvious that records obtained in accordance with the present invention are equivalent to records obtained by conventional means using several thousand detectors without, in fact, using such a large number of detectors. At the same time, the resultant records are sufficiently similar to conventional records to permit correction in conventional seismic record correctors and may be conveniently correlated.

It is obvious that various modifications of applicant's invention may be carried out without departing from the basic concepts involved. For example, more than two seismometer stations may be employed in order to get a greater degree of subsurface coverage or to cover a longer traverse so long as the seismometer groups located adjacent the ends of the traverse are located adjacent the division between the first and second segments of the traverse and between the next to the last and last segments of the traverse. In other words, if traverse 1 were desirably made 3,000 feet long, a seismometer group could be located adjacent point 17, a second could be located adjacent point 25, and a third midway between points 17 and 25. This arrangement would obviously result in improved subsurface coverage because of the greater length of the traverse. Similarly, a traverse could be divided into a number of segments such that four detector stations could be employed, one adjacent the division between the first and second segments, one adjacent the division between the next to the last and the last segments, and two equally spaced between the first and second.

Although the illustrative example shows a case in which each successive compositing of the drops in two adjacent segments overlap the next preceding composited drops by 50 percent, depending upon the number of segments into which the traverse is divided and the desired degree of subsurface coverage, one may operate with no overlap or may employ a greater degree of overlap than 50 percent. In short, it has been found that if the traverse is divided into at least three segments or any other larger odd number of segments, the operator must, in compositing the individual segments, have some degree of overlap in order to obtain continuous subsurface coverage, provide two tie traces in the center of the record which follow basically the same travel path and provide tie traces at each end of the record which will be the same as and follow the same path as the end traces on the record for an adjacent traverse, all in accordance with the present invention. On the other hand, if the traverse is divided into at least four segments or any other larger even number applicant's results may be obtained by either overlapping during compositing or simply by combining the signals from all sources within sequential pairs of segments. Referring again to the figures, in the latter instance, one would combine the signals from all drops within segments 3 and 5, all drops within segments 7 and 9, and all drops within segments 11 and 13 and thus produce three traces for the energy received by seismometer group 29 and three traces for the energy received by seismometer group 29 and three traces for the energy received by seismometer group 31 from each of the three pairs of segments.

Thus, as pointed out above, if an odd number of segments are employed, one must overlap in compositing; whereas, if an even number of segments are employed, one may overlap in compositing or have no overlap. It has been found that applicant's novel method and results, that is, continuous subsurface coverage, two center tie traces following essentially the same path, and end traces which may be tied to the end traces of a record from an adjacent traverse, will obtain if the following mathematical relationship is employed in laying out the traverse and compositing the signals:

$$\frac{100n}{100-X}+2=T$$

where;
$n$=the number of segments between seismometer groups,
$X$=percent overlap of signals composited in adjacent traces, and
$T$=the total number of resultant traces of composited signals.

It is to be observed that this relationship holds true, and applicant's results are obtained for both the case in which 0 percent overlap is employed as well as where preselected degrees of overlap are employed. For instance, referring to the example given in FIGURES 2 and 3, with 50 percent overlap, the total number of resultant traces is 10 as illustrated in FIGURE 3 and as computed by the above relationship. In addition, the two center tie traces are obtained, continuous subsurface coverage is obtained, and the two end traces may be employed as tie traces for traverses adjacent either end of traverse 1. Similarly, for the suggested alternative in which the percent overlap is 0, the composited traces would represent subsurface points 39, 43, 47, 51, and 55, with subsurface point 47 being represented by two travel paths in opposite directions. In other words, in the relationship given, $n$ would be 4, $X$ would be 0, and the total number of traces as a result of compositing would be 6, both in accordance with the above-stated relationship and in accordance with the results shown by drawing out the travel paths obtained by compositing as in FIGURE 2. Other examples which illustrate the validity of this relationship are as follows: If the traverse is divided into five equal segments, and therefore, $n$=3, 25 percent overlap will give applicant's results and the total number of traces resulting from compositing will be 6. In like manner, if the traverse were divided into a total of four segments, $n$ would be 2; and, if we choose a 90 percent overlap, the total number of traces will be 22, and applicant's results will again be obtained. It should also be observed that in any operation in accordance with the present invention the first group of disturbances composited symmetrically span the first detector group and the last group of disturbances composited symmetrically span the last detector group.

It should also be recognized that all the individual weight drop signals in a complete traverse need not be recorded before compositing is performed. In the example given, where sixty drops are made, two seismometer groups are employed and 50 percent overlap is used in compositing, a maximum of thirty individual signals would be recorded at any one time, these would be composited, the composites recorded, the individual signals erased and another group recorded on the ferromagnetic medium. Further, by the use of appropriate switching mechanisms smaller numbers of individual signals (for example, 5) may be recorded, composited and erased and these composites combined to form the ultimate composite.

Other and further alternatives and modifications will be apparent to those skilled in the art and thus modifications which do not depart from applicant's basic concepts, as disclosed herein, are intended to be included. Accordingly, the present invention is to be limited only in accordance with the appended claims.

I claim:
1. In a simplified and improved weight dropping method for conducting seismic exploration along a generally straight drop line wherein uncorrected outputs from two geophone groups are used to produce in the field conventional seismic single record profiles of at least portions of the drop line, and said single record profiles can be operated on in a conventional manner to remove fixed and moveout errors comprising the steps of:
 (1) establishing a substantially straight drop line,
 (2) dividing said drop line into a number of segments said segments being at least four in number,
 (3) locating a first and second geophone group in the vicinity of said drop line and spaced from one another along said drop line,
 (4) generating a plurality of elastic waves in each of said segments by weight dropping operations,
 (5) detecting said elastic waves at each of said geophone groups,
 (6) simultaneously recording outputs of each of said geophone groups produced by said detected elastic waves created by each weight drop,
 (7) combining directly in uncorrected form all first geophone group outputs produced by said weight dropping operations in a first pair of adjacent segments as a first signal,
 (8) repeating step 7 for each of a preselected number of successive other pairs of adjacent segments as a next sequential signal,
 (9) simultaneously with step 7 combining directly in uncorrected form all second geophone group outputs produced by said weight dropping operations in said first pair of adjacent segments as a signal to be positioned succeeding the last signal produced in step 8,

(10) repeating step 9 for said each of said preselected number of successive other pairs of adjacent segments simultaneously with step 8 as a next sequential signal,

(11) recording in the field on a single record said signals produced in steps 7 through 10 as individual traces whereby said single record becomes a conventional seismogram displaying the profile of earth underlying said preselected pairs of segments of the drop line combined in steps 7 and 8,

(12) automatically removing fixed and variable errors from said seismogram by operating on said seismogram with a seismic, record corrector adapted to operate on conventional seismic records.

2. In a method as set forth in claim 1 wherein at least five weight drops are used in each segment to generate elastic waves.

3. In a method as set forth in claim 1 wherein the first and second geophone groups are offset on the same side and at equal distances from the drop line.

4. In a method as set forth in claim 1 wherein the first and second geophone groups are arranged in circular configurations.

5. In a method as set forth in claim 1 wherein each segment is less than 250 feet in length.

References Cited in the file of this patent

UNITED STATES PATENTS

| | | |
|---|---|---|
| 2,321,450 | Athy et al. | June 8, 1943 |
| 2,732,906 | Mayne | Jan. 31, 1956 |
| 2,849,076 | Kaufman | Aug. 26, 1958 |
| 2,851,121 | McCollum | Sept. 9, 1958 |

OTHER REFERENCES

Palmer: "A New Approach to Seismic Exploration," World Oil Magazine, vol. 138, No. 7, June, 1954, pages 140, 142, 146, 148, 151, 152, 154, 156, 158.

Publication: "Geograph," by McCollum Exploration Co., pages 15 to 17, 23, 24, 31 to 33, and 40 to 43 relied on.